3,585,249
SULFUR PROMOTED OXIDATIVE DEHYDRO-
GENATION OF ORGANIC COMPOUNDS
Abraham D. Cohen, Noel J. Gaspar, and Israel S. Paster-
nak, Sarnia, Ontario, Canada, assignors to Esso Re-
search and Engineering Company
No Drawing. Filed Dec. 2, 1968, Ser. No. 780,570
Int. Cl. C07c 5/20, 15/10
U.S. Cl. 260—669                                    23 Claims

ABSTRACT OF THE DISCLOSURE

Organic compounds having a dehydrogenatable carbon-carbon bond are dehydrogenated in the vapor phase by contact with a mixture of sulfur containing compounds and oxygen or an oxygen containing mixture, the oxygen being introduced throughout the reaction zone in staged increments, each increment being insufficient to cause substantial burning of the organic feed, the reaction being preferably effected in the presence of a suitable low surface area catalyst and an inert diluent; the sulfur containing compounds used in the reaction are comprised of those which (i) react with the organic fed to yield hydrogen sulfide or sulfur and/or (ii) react with oxygen to yield sulfur oxide and/or sulfur. These compounds cannot only be added all at the feed inlet but may also be added to the reaction zone in a staged manner, i.e., both at the feed inlet and in increments downstream of the feed inlet, to minimize undesirable heavy product formation and catalyst deactivation.

FIELD OF THE INVENTION

The invention relates to a process for the vapor phase dehydrogenation of organic compounds. More particularly, this invention relates to an improved proces for effecting the dehydrogenation of dehydrogenatable organic compounds, i.e., compounds having at least one

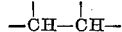

grouping wherein adjacent carbon atoms are bonded to each other and at least one hydrogen atom is bonded to each carbon atom, by contacting such compounds in the vapor phase at elevated temperatures with a sulfur containing compound and oxygen or an oxygen containing gas, the oxygen being introduced throughout the reaction zone in staged increments, each increment being insufficient to cause substantial burning of the organic feed. Preferably, the reaction is effected in the presence of a suitable low surface area catalyst and inert diluent. The sulfur containing compounds used in the reaction are comprised of those which (i) react with the organic feed to yield hydrogen sulfide or sulfur and/or (ii) react with oxygen to yield sulfur oxide and/or sulfur. The sulfur containing compounds cannot only be added all at the feed inlet but may also be added to the reaction zone in a staged manner, i.e., both at the fed inlet and in increments downstream of the fed inlet, to minimize undesirable heavy product formation and catalyst deactivation.

PRIOR ART

The vapor phase dehydrogenation of organic compounds to produce unsaturated products, or products more highly unsaturated than the feed stock, in the presence of sulfur containing compounds such as sulfur dioxide has long been known to the art; see for example U.S. 2,126,817. Generally, the over-all reaction for the sulfur dioxide dehydrogenation of a hydrocarbon feed is in accordance with the following generalized expression:

$$3C_nH_{2n+2} + SO_2 \rightarrow 3C_nH_{2n} + H_2S + 2H_2O \qquad (1)$$

which shows that one-third mole of sulfur dioxide is theoretically required to abstract one mole of hydrogen from the feed stock. While many such processes have been reported, the commercial development of a sulfur or sulfur oxide promoted dehydrogenation process has been rather permanently delayed due to serious problems involving coking in the reactor, short catalyst life and burning of the feed stock. Thus, while it is believed that dehydrogenation is the principal reaction occurring, in the above case, as shown by Equation 1, a portion of the feed stock is usually also burned and/or cracked with the undesirable formation of coke in the reactor. These coking and/or cracking reactions are further enhanced by the presence of sulfur containing compounds which are formed as by-products during the reaction and which ae known to promote such reactions at dehydrogenation temperatures. Moreover, due to losses of the sulfur or sulfur oxides in undesirable side reactions with hydrocarbons, i.e., burning to carbon dioxide and water, formation of thiophenes, etc., these compounds are usually employed in amounts far exceeding the theoretical, e.g., equimolar, required for dehydrogenation and, therefore, further contribute to the production of heavy products, e.g., especially undesirable sulfur containing organic compounds which not only reduce selectivity to the desired product but also rapidly deactivate the catalyst via coke formation. In copending application, Ser. No. 780,528, Ser. No. 780,603, and Ser. No. 780,608, all filed of an even date herewith, processes have been described which tend to eliminate or substantially reduce cracking and/or burning reactions and allow the use of sulfur oxide promoter levels which more closely approach the theoretical. The pertinent disclosures of Ser. No. 780,528, Ser. No. 780,603, and Ser. No. 780,604 are, therefore, hereby incorporated by reference. The present invention, however, represents a further advance over that reported in the mentioned copending applications and allows the use of even lower amounts of sulfur oxide promoter and/or increased conversions and yields.

SUMMARY OF THE INVENTION

In accordance with this invention, therefore, an improved process is provided for the vapor phase dehydrogenation of dehydrogenatable organic compounds which comprises reacting, in a suitable reaction zone, the dehydrogenatable organic compound with a sulfur containing compound and oxygen or an oxygen containing mixture, the oxygen being introduced throughout the reaction zone in staged increments, i.e., at more than one point in the reaction zone, each increment being insufficient to cause substantial burning of the organic feed. Preferably, the reaction is effected in the presence of a suitable low surface area catalyst and inert diluent. The sulfur containing compounds used in the reaction are comprised of those which (i) react with the organic fed to yield hydrogen sulfide or sulfur and/or (ii) react with oxygen to yield sulfur oxide and/or sulfur. The sulfur containing compounds cannot only be added all at the feed inlet but may also be added to the reaction zone in a staged manner, i.e., both at the feed point and in increments at at least one point downstream of the feed point, to minimize undesirable heavy product formation and catalyst deactivation.

As stated above, the sulfur containing compounds that can be employed in this invention can generally be described as belonging to either one or both of the following groups: (i) sulfur containing compounds that react with the organic feed stock to yield hydrogen sulfide and/or sulfur, and (ii) sulfur containing compounds that react with oxygen to yield sulfur and/or sulfur oxide. Since it is believed that the dehydrogenation reaction is promoted by the sulfur compounds in either of the above two groups, these compounds can be readily referred to as sulfur promoters. More specifically, the sulfur promoter compounds of (i) can include the sulfur oxides, i.e., sulfur dioxide and sulfur trioxide, and their respective water solutions, $H_2SO_3$ and $H_2SO_4$, elemental sulfur, ammonium sulfite, $(NH_4)_2SO_3$ and ammonium sulfate, $(NH_4)_2SO_4$. Other such compounds will be readily recognized to those versed in the art.

The sulfur containing compounds designated in (ii), above, can be any of a wide variety of compounds such as hydrogen sulfide, carbon disulfide, mercaptans, thiophenes, ammonium sulfides, organic sulfides, sulfones, and the like, as well as, of course, elemental sulfur itself. Specific examples of such organic compounds are $C_1$ to $C_7$ mercaptans, e.g., ethyl mercaptan, propyl mercaptan, butyl mercaptan, dimercaptans; $C_4$ to $C_{12}$ thiophenes, e.g., thiophene, bithiophene; $C_2$ to $C_{12}$ organic sulfides, e.g., dimethyl sulfide, diethyl sulfide.

Of the group (ii) sulfur containing compounds the simple readily available inorganic compounds are preferred, e.g., hydrogen sulfide and elemental sulfur, since the more complex organic sulfur compounds, while they do release useful sulfur compounds on contact with oxygen, also tend to burn to $CO_2$ and $H_2O$. This not only reduces oxygen utilization to useful products but also tends to promote hot spot formation on the catalyst where burning of the hydrocarbon feed may readily occur.

Of all the sulfur containing compounds of (i) and (ii) the sulfur oxides are preferred since the exothermicity of the over-all dehydrogenation reaction is reduced resulting in better selectivity to desired product due to the minimization of hydrocarbon loss via burning.

Of the sulfur oxides, sulfur dioxide is preferred due to its ready availability and relative low cost.

While not wishing to be bound by any particular theory, a possible reaction mechanism will be given for a typical embodiment of this invention, e.g., the use of sulfur dioxide with staged incremental oxygen addition to effect the dehydrogenation of ethylbenzene to styrene. Here the dehydrogenation of ethylbenzene can occur via the three over-all equations:

$$C_6H_5C_2H_5 + \tfrac{1}{3} SO_2 \rightarrow C_6H_5C_2H_3 + \tfrac{1}{3} H_2S + \tfrac{2}{3} H_2O \quad (2)$$
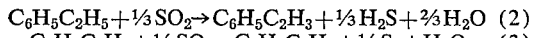
$$C_6H_5C_2H_5 + \tfrac{1}{2} SO_2 \rightarrow C_6H_5C_2H_3 + \tfrac{1}{4} S_2 + H_2O \quad (3)$$
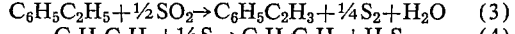
$$C_6H_5C_2H_5 + \tfrac{1}{2} S_2 \rightarrow C_6H_5C_2H_3 + H_2S \quad (4)$$
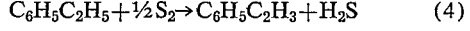

The function of the oxygen introduced in each stage is to react with the hydrogen sulfide and/or sulfur present (or being rapidly produced) to regenerate the active dehydrogenation species, i.e., $SO_2$ and/or $S_2$ via the following over-all reactions:

$$H_2S + 3/2 O_2 \rightarrow H_2O + SO_2 \quad (5)$$
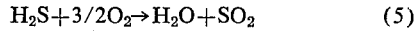
$$H_2S + \tfrac{1}{2} O_2 \rightarrow H_2O + \tfrac{1}{2} S_2 \quad (6)$$
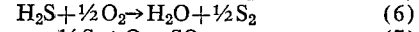
$$\tfrac{1}{2} S_2 + O_2 \rightarrow SO_2 \quad (7)$$

Thus, it is believed evident that the hydrogen sulfide and sulfur present in the reaction zone act as promoters for the over-all reaction:

$$C_6H_5C_2H_5 + \tfrac{1}{2} O_2 \rightarrow C_6H_5C_2H_3 + H_2O \quad (8)$$
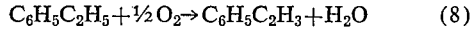

Here the addition of oxygen in suitable small increments, rather than in one large addition, serves two purposes: firstly, to prevent the hydrocarbons, i.e. ethylbenzene and styrene, from being in contact with the oxygen for an undue length of time; and, secondly, to prevent the highly exothermic over-all reaction (8) from creating hot spots on the catalyst surface. Therefore, excessive loss of styrene selectivity to burning and cracking is prevented.

In general, the dehydrogenation of a hydrocarbon with sulfur dioxide and staged oxygen occurs according to the following idealized expression:

$$C_nH_{2n+2} + a/3\, SO_2 + \tfrac{1-a}{2} O_2 \longrightarrow C_nH_{2n} + a/3\, H_2S + \tfrac{3-a}{3} H_2O$$
$$(9)$$

with $0 \leq a \leq 1$. When other sulfur compounds or mixtures thereof are employed in place of sulfur dioxide it is evident that the total oxidant available for the dehydrogenation process must be nearly equivalent in all cases for equivalent product yields although individual cases can and will differ. For example, it is obvious that when sulfur dioxide is replaced by $H_2S$ an extra 1.5 moles of oxygen per mole of hydrogen sulfide will be necessary to ensure that the hydrocarbon feed encounters the same amount of oxidant in the catalyst bed.

It is convenient to define the total available oxidant as the oxidant, in the reaction zone, in the form of sulfur and/or sulfur oxides as well as oxygen, available for dehydrogenation of the feed after the sulfur compound or compounds employed as a promoter has reacted with oxygen. (Obviously, if a sulfur dioxide promoter is employed there is no reaction of the promoter with oxygen, while if a methyl mercaptan promoter is employed loss of oxidant would occur due to the formation of carbon oxides and water.) It is convenient to state the total available oxidant in terms of its theoretical dehydrogenation capability in equivalent moles of oxygen. Thus, for example, when the mole ratio of available oxidant to, say ethylbenzene is 0.5, this is meant to imply that the available oxidant introduced into the reaction zone has the theoretical dehydrogenation capability of 0.5 moles of oxygen. (For example, 0.16 of a mole sulfur dioxide plus 0.25 of a mole of oxygen per mole of ethylbenzene gives a mole ratio of available oxidant to ethylbenzene of 0.5.)

Table I shows the levels of available oxidant that can be used in accordance with this invention.

TABLE I

| | Broad range | Preferred | Most preferred |
|---|---|---|---|
| Moles available oxidant/mole of $H_2$ to be abstracted | 0.01–1.5 | 0.2–1.0 | 0.3–0.8 |

It is noted that these ratios are reported in terms of the moles of available oxidant per mole of "hydrogen to be abstracted." Thus, for example, when hexane is dehydrogenated to hexene, one mole of hydrogen per mole of feed is to be abstracted, but when hexane is dehydrocyclized to benzene, 3 moles of hydrogen per mole of feed is to be abstracted. Thus, depending upon the extent of dehydrogenation desired, the amount of available oxidant will vary proportionally with the ranges shown in Table I.

Similarly, it is convenient to report the amount of promoter necessary in terms of moles of available sulfur promoter per mole of hydrogen to be abstracted. Here the term "moles of available sulfur promoter" is defined as the number of moles of sulfur dioxide a given promoter is theoretically capable of producing. For example, 0.2 mole of hydrogen sulfide, sulfur dioxide, sulfur trioxide or methyl mercaptan and 0.1 mole of dimethyl disulfide all contain 0.2 moles of available sulfur promoter. Table II, below, shows the sulfur promoter levels that can be employed with this invention.

TABLE II

| | Broad range | Preferred | Most preferred |
|---|---|---|---|
| Moles of available sulfur promoter/mole of $H_2$ to be abstracted | 0.001–0.6 | 0.01–0.5 | 0.05–0.3 |

For the particular embodiment of this invention wherein sulfur dioxide is employed with staged incremental oxygen addition to dehydrogenate ethylbenzene to styrene, Table III, below, gives the available oxidant and sulfur dioxide levels that can be employed in accordance with this invention.

TABLE III

| | Broad range | Preferred | Most preferred |
|---|---|---|---|
| Moles available oxidant/mole ethylbenzene | 0.01–1.5 | 0.2–1 | 0.3–0.8 |
| Moles of SO₂/mole ethylbenzene | 0.001–0.6 | 0.01–0.5 | 0.05–0.3 |

Here it should be noted that it is not necessary for all of the sulfur promoter, e.g., $SO_2$, to be added to the reaction zone with the hydrocarbon feed in one increment. It may be advantageous, under some conditions, to add the sulfur promoter in stages with the staged oxygen increments or between the staged oxygen increments to obtain the maximum dehydrogenation efficiency, i.e., maximum yields, minimum heavy product formation, and minimum catalyst deactivation.

Essentially, the basic improvement provided by the invention over that specified in Ser. No. 780,528, Ser. No. 780,603 and Ser. No. 780,604 is the addition of oxygen throughout the reaction zone in staged increments. Thus, the oxygen additions can be viewed as dividing the reaction zone in to several dehydrogenation zones, i.e., if there are $n$ oxygen addition points then there will be $n+1$ dehydrogenation stages, when oxygen is not added with the feed and $n$ dehydrogenation stages when oxygen is added with the feed. It is believed that the presence of oxygen in the reaction zone tends to (a) regenerate the sulfur promoter, as previously indicated, and (b) help burn off any coke that may have been formed on the catalyst. An obvious advantage of regenerating the promoter is that less promoter is required initially, and as shown in Table II the amounts of promoter required are rather low relative to prior art processes for producing equivalent yields and conversions. This, in turn, leads to less coke formation and a general increase in the efficiency of the reaction. The credit due to oxygen staging can thus be taken as either a decrease in the quantity of sulfur promoter used and/or an increase in the reaction conversion and yield.

Regardless of the sulfur compound used as the promoter, $H_2S$ and/or sulfur is produced after the first dehydrogenation stage. The regeneration of $H_2S$ and/or sulfur must thus rely on the preferential reaction of oxygen with the hydrogen sulfide and/or sulfur product. If the oxygen reacts primarily with the feed stock or hydrocarbon product, burning will occur and the process will be neither technically nor economically attractive. In order to insure that the oxygen reacts preferentially with the hydrogen sulfide and/or sulfur, the amount of oxygen injected at any point must be insufficient to cause any substantial amount of burning of the dehydrogenatable feed compound. More specifically, the amount of oxygen, as $O_2$ added to the reaction zone at each point of addition should generally not exceed a molar ratio of about 1.5 relative to the amount of hydrogen sulfide present in the reaction zone at that point, and should not exceed about 1.0 relative to the amount of sulfur present. In addition to limiting the quantity of oxygen at each addition point, it may be desirable, in some cases, to lower the reactor temperature, below the average reaction temperature, at the points of oxygen addition to ensure that burning of the hydrocarbon feed is kept to a minimum. This can be readily accomplished by, for example, inserting cooling coils at the points of oxygen addition other than the feed. The lower limit of oxygen used at each addition point is not generally important since any amount of added oxygen will aid the process, the only requirement being that some oxygen be added. The number of addition points is not essential and any number may be employed so long as there is at least one addition point other than the feed. Further, the amount of oxygen added at each point can be the same or different as that added at any other point.

The use of oxygen in the reaction system to incerase yields and conversions is particularly surprising in view of the prior art. For example, in U.S. 3,199,155, it is specifically stated that oxygen should not be used since it causes burning of the feed stock. Nevertheless, by limiting the amount of oxygen added to the reaction zone the feed stock is not burned and the efficiency of the reaction is increased. Furthermore, by employing the incremental addition technique, conversions and yields can be increased over and above that which would result from adding the total amount of oxygen with the feed.

As previously mentioned, a controlled amount of oxygen can also be added with feed, over and above the previously mentioned total amount to be added. Again, the criteria as to how much oxygen can be included with the freed relates to the burning of the feed stock and the fact that burning is detrimental. Consequently, the amount of oxygen included with feed is that which is insufficient to cause substantial burning of the feed. More specifically, the oxygen included in the feed should not be in excess of about 0.2 mole/mole of hydrogen to be abstracted. Preferably, the feed oxygen level should range from about 0.01 to 0.2 mole/mole of hydrogen to be abstracted, and more preferably from about 0.01 to 0.15 mole/mole of hydrogen to be abstracted. The oxygen in the feed or the oxygen that is later added can, of course, be oxygen per se, or any oxygen-containing gas, such an air, oxygen-helium, oxygen-argon, oxygen-carbon monoxide, oxygen-steam, etc. or any oxygen-inert gas mixture as the inert gases are descrived herein.

The process of this invention can be applied to a great variety of dehydrogenatable organic compounds to obtain the unsaturated derivatives thereof. A suitable dehydrogenatable compound can be any organic compound that contains at least one

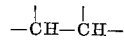

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogens, nitrogen, and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative applications include: ethylbenzene to styrene, isopropyl benzene to α-methyl styrene, cyclohexane to benzene, vinyl cyclohexane or vinyl cyclohexene to styrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine, and the like. Preferred dehydrogenatable feed stocks are the $C_2$ to $C_{20}$ hydrocarbons, i.e. paraffins, alkyl benzenes, alkyl and alkenyl substituted cycloaliphatic compounds, and monoolefins. Particularly preferred, however, are $C_2$ to $C_9$ paraffins, $C_3$ to $C_9$ monoolefins, $C_8$ to $C_{16}$ alkyl benzenes, and $C_8$–$C_{16}$ alkyl and alkenyl substituted cycloaliphatic compounds, still more particularly $C_4$ to $C_8$ monoolefins and paraffins, $C_8$ to $C_{10}$ alkyl benzenes, and $C_8$ to $C_{10}$ alkyl and alkenyl substituted cycloaliphatic compounds. Particularly effective as feed stocks are the olefinic hydrocarbons or alkyl benzenes or vinyl substituted cycloaliphatics which may be dehydrogenated to provide a product wherein the major unsaturated product has the same number of carbon atoms as the feed hydrocarbon. Ethylbenzene is a particularly preferred dehydrogenatable compound and its reaction with sulfur dioxide promoter, for example, and oxygen in accordance with the invention described herewith results in ethylbenzene conversions in excess of 80%, preferably 85%, with selectivity to styrene in excess of 85%, preferably 90%, resulting in styrene yields in excess of 75%, preferably in excess of 80%.

In yet another embodiment, dehydrocyclization can also be effected. Thus, $C_6$ to $C_8$ paraffins, e.g., hexane, heptane, octane, can be converted into $C_6$ to $C_8$ aromatics, e.g., benzene, toluene, ethylbenzene, paraxylene.

The inert gas which may be employed to reduce the partial pressure of the reactants may be any gas normally inert under the conditions of the reaction. Illustrative of the gases that may be employed are: helium, nitrogen, carbon monoxide, carbon dioxide, steam, etc., as well as methane, waste gases containing methane, and mixtures of the foregoing. Preferably, however, the diluent is steam or a mixture of diluents which is primarily steam, e.g., steam and helium, steam and nitrogen, steam and carbon dioxide, etc.

The molar ratio of inert diluent to dehydrogenatable compound is not critical and may vary over a wide range as long as at least about one mole of diluent per mole of dehydrogenatable compound is present. This value, however, is merely an arbitrary limit at which the yield of dehydrogenated product becomes practical and economical. Molar ratios below this value will also show increases in yield, generally the conversion and yield increasing with increased dilution of the sulfur promoter. The upper limit is not at all critical and larger amounts of diluent will only serve to further reduce the partial pressure of the reactants. Preferably, however, a molar ratio of 1 to 20, more preferably 1 to 8, of diluent to dehydrogenatable compound is employed. It will be obvious to one skilled in the art that this same result can be accomplished by operating under reduced pressures. However, use of an inert diluent is preferred, since it alleviates problems of vacuum equipment.

The conditions under which the reaction is effected are not generally critical and can be the conditions under which normal vapor phase catalytic dehydrogenation reactions are effected. Thus, reaction temperatures should be at least about 700° F., preferably 800 to 1500° F., and more preferably 900 to 1200° F. Similarly, pressures may vary widely and can range from subatmospheric, e.g., 0.1 atm., to superatmospheric, e.g., 50 atm. or higher. Preferably, however, pressures may range from about 1 to 3 atm.

As previously mentioned, it is desirable to employ low surface area catalysts for the reaction described herein. The low surface area requirement is necessitated by the fact that the catalyst must be selective to the desired reaction while minimizing undesired side reactions such as cracking and/or burning. Various catalysts can be employed which satisfy the low surface area criterion, among which are those that are or could be employed as catalyst support materials. These catalysts can also be described as difficultly reducible oxides or refractory oxides or mixtures of oxides and can be selected from the oxides of metals of Groups II–VIII of the Periodic Chart of the Elements, preferably of Groups II–A, III–A, IV–A, IV–B, V–B, VI–B and VII–B and most preferably Groups V–B and III–A. Suitable examples of such materials are magnesia, barium oxide, thoria, alumina, boria, vanadia, chromia, titania, silica, silica-alumina, tungsten oxide, zirconia, hafnium oxide and the like. Of these, silica, alumina, vanadia, magnesia, and titania are more preferred, particularly alumina and titania. It will be recognized that these catalysts need not start out as oxides but may be converted to oxides during the course of the reaction. For example, a nitrate or hydroxide salt is readily converted to its corresponding oxide at reaction temperatures.

Another class of catalysts applicable to this invention and highly preferred are those based on titanium and oxygen, i.e., titanates. These catalysts have shown exceptional stability and give good yields of the desired dehydrogenated products. Applicable titanates are those wherein any metal from Groups I–VIII of the Periodic Chart of the Elements is combined with titanium and oxygen. Typically active titanates are: lithium titanate, barium titanate, cerium titanate, nickel titanate, lead titanate, strontium titanate, and the like. It is noted that titanium metal, by itself, can also be employed successfully.

Additionally, such common support materials as silicon carbide; carbon, e.g., coke, graphite; diatomaceous earths, e.g., kieselguhr; clays, both natural and synthetic, e.g., attapulgite clays; magnesium silicates; phosphates, e.g., calcium nickel phosphate, aluminum phosphate; and the like which are of low surface area can also be employed, although somewhat less effectively than the other materials listed hereinabove.

Of course, all of the catalysts mentioned hereinabove are low surface area catalysts (as measured by nitrogen adsorption) and can be successfully employed in the dehydrogenation process. Nevertheless, it has also been found that a critical surface area range exists for many catalysts within which the yield of dehydrogenated product is markedly greater than would ordinarily be expected, as reported in Ser. No. 780,528. Thus, for example, alumina catalysts have a critical surface area range starting above a threshold surface area of about 0.6 m.$^2$/gram where the yield of dehydrogenated product increases by about ten-fold. While a critical upper limit where product yield falls off sharply does not exist as such, the increasing make of by-products and increased coking which accompany increasing surface area establishes a critical upper limit above which it become uneconomical to proceed with the reaction. Consequently, it is preferred that alumina catalysts have a surface area ranging from about 0.6 to 100 m.$^2$/gm., preferably about 0.6 to 50 m.$^2$/gm., and more preferably about 0.6 to 30 m.$^2$/gm.

The exact surface area levels for the catalysts which result in markedly increased product yields are not known with exactitude because of the many and varied catalysts which can be employed herein. Nevertheless, it is believed that one skilled in the art can readily determine these levels, particularly since the levels are thought to be rather similar to that determined for alumina, i.e., at least above about 0.5–1.0 m.$^2$/gram.

Now, it can be generally said that the higher the surface area, the more the coking and burning, the higher the quantity of sulfur oxide required for a given yield, and the lower the catalyst life. Taking these directions into consideration, lower surface areas are to be preferred and surface areas that are readily usable in the process of this invention, regardless of catalyst material, should range from about 0.1 m.$^2$/gm. to about 100 m.$^2$/gm., preferably 0.1 to 70 m.$^2$/gm., more preferably about 0.5 to 50 m.$^2$/gm., again keeping in mind minor variations depending upon choice of catalyst.

In another embodiment hereof, it has been found that a catalyst which incorporates a minor proportion of a metal or a metal salt, e.g., halides, phosphates, sulfates, etc., oxide, or hydroxide of an alkali or alkaline earth metal or of palladium promotes an increase in the yield of dehydrogenated product and often increases the life of the catalyst. Many of these salts, oxides, hydroxides or metals may change during the preparation of the catalyst, during heating in the reactor, prior to, or during the reaction or are converted to another form under the reaction conditions, but such materials still function as effective catalysts in this process. For example, many metals, metal nitrates, nitrites, carbonates, hydroxides, acetates, sulfites, sulfides, and the like, may be readily converted to the corresponding oxide under the defined reaction conditions. Salts such as phosphates, silicates and halides are stable at reaction conditions, and are also effective in increasing catalyst life. At any rate, the catalysts are effective, if the listed metals or their compounds are present in a catalytic amount in contact with reaction gases. Preferred are the oxides and chlorides of the listed metals, as well as the metals themselves. Of the alkali metals, i.e., lithium, sodium, potassium, rubidium, and cesium, it is preferred to utilize sodium or potassium as the metals or derivatives thereof, most preferably sodium. Of the alkaline earth metals, i.e., beryllium, magnesium, calcium, strontium, and barium, it is preferred to utilize calcium or barium as the metals or derivatives thereof, post preferably barium. It is also noted that palladium, i.g., palladium chloride, acts similarly as the alkali or alkaline earth metals with regard to increasing both yield and catalyst life. While, generally, all of the metals will increase catalyst life, sodium and barium are particularly preferred since they are significantly effective in increasing yield in addition to increasing catalyst life. The amount of this added material is not generally critical and usually any amount will be helpful. Preferably, however, the added material will make up about 0.1 to 50 wt. percent of the catalyst, more preferably about 0.3 to 10 wt. percent.

In a typical reaction sequence for the conversion of ethylbenzene to styrene, for example, ethylbenzene, a sulfur compound, e.g., $SO_2$, water diluent and a small amount of oxygen are preheated in a furnace and fed to a reactor containing the desired catalyst. At intervals through the catalyst bed further small amounts of oxygen with or without additional steam are added. When the desired conversion of the ethylbenzene is reached, the reaction products are removed from the reactor and cooled to about 500° F. At this temperature sulfur is condensed and withdrawn from the product stream, burned to $SO_2$ and recycled to the reactor. The remaining products are further cooled to condense the steam and liquid hydrocarbon product. The water and hydrocarbon are separated, part of the water being discarded and the remainder being recycled to the reactor. The hydrocarbon product is fed to a distillation train to recover pure styrene for further use and unconverted ethylbenzene which is recycled to the reactor. The off-gas from the separator, which consists mainly of $H_2S$ and $CO_2$ is fed to a converter where the $H_2S$ is oxidized to sulfur and thence to $SO_2$ for recycle to the reactor.

In the case where the hydrocarbon product is gaseous, e.g., dehydrogenation of butene to butadiene, the reaction sequence would be identical except that the off-gases from the separator would be fed to an absorber where the hydrocarbon feed and product would be removed and the tail gas, $H_2S$ and $CO_2$, would be sent to the burner for regeneration of $SO_2$ for recycle. The hydrocarbon product would be recovered by stripping and would then be purified by conventional means.

Having now described the invention, the following examples will further serve to illustrate the inventive process. However, no limitations are to be implied from these examples since variations and modifications thereof will be readily apparent to those skilled in the art.

In the examples noted below, ethylbenzene, sulfur dioxide, oxygen and inert diluent (He or $H_2O$) were metered into a reactor consisting of a 1″ diameter Vycor or stainless steel tube, in an electrically heated tube furnace. The reactor contained an appropriate catalyst into which, at intervals down the bed, additional oxygen and diluent could be injected. The reaction products leaving the reactor were quenched in a water cooled condenser and the liquid products were removed in a separator. The water layer was separated from the hydrocarbon layer and each was weighed. The hydrocarbon was then analyzed chromatographically. The off-gas from the separator passed through a density measurement bomb, through a bubble-meter for measuring its production rate and thence to a gas chromatograph for analysis. From these measurements a complete weight and material balance of feed and product could be obtained.

Example 1

This example shows the effect of the method of oxygen addition. 100 grams of catalyst were put into a reactor in three beds of 33.3 gms. Each and oxygen was added (a) all together and (b) in two separate injections. Results are shown in Table IV.

TABLE IV

Catalyst=99.5% $Al_2O_3$-0.5% $Na_2O$ (S.A.=3 m.²/g.).
EB Sp. Vel.=0.1 w./w./hr. (0.3 w./w./hr. per bed).
Temperature=1100° F.
All results at 5½ hours onstream.

(a) Feed mole ratio—1st stage—EB/$SO_2$/$O_2$/He/$H_2O$= 1/0.2/0.5/2.8/2.

| | Percent |
|---|---|
| EB conv. | 74 |
| Sty. sel. | 89 |
| Sty. yield | 66 |
| Burning | 4.5 |

(b) Feed mole ratio—
1st Stage=EB/$SO_2$/He/$H_2O$=1/0.2/1/2
2nd Stage=$O_2$/He=0.3/1.1
3rd Stage=$O_2$/He=0.2/0.8

| | Percent |
|---|---|
| EB conv. | 91 |
| Sty. sel. | 88 |
| Sty. yield | 79 |
| Burning | 3.2 |

The data show that ethylbenzene conversion and styrene yield increased significantly when the oxygen was staged, even though the same total amount of oxygen was employed. The amount of feed burned to CO and $CO_2$ was also markedly decreased evidencing a greater utilization of the feed.

In a second run of this experiment, each catalyst bed was diluted with porcelain beads and similar results were obtained. Thus, the use of the inert porcelain beads served only to dilute the catalyst but did not prevent burning of the feed as might be expected. Results are shown in Table V.

TABLE V

Catalyst=99.5% $Al_2O_3$-0.5% $Na_2O$ (S.A.=3 m.²/g.).
EB Sp. Vel.=0.3 w./w./hr. (0.9 w./w./hr. per bed).
Temperature=1100° F.
All results at 5½ hours onstream.

(a) Feed mole ratio—1st Stage=EB/$SO_2$/$O_2$/He/$H_2O$= 1/0.2/0.5/2.8/2

| | Percent |
|---|---|
| EB conv. | 63 |
| Sty. sel. | 87 |
| Sty. yield | 56 |
| Burning | 4.8 |

(b) Feed mole ratio—
1st Stage=EB/$SO_2$/He/$H_2O$=1/0.2/1/2
2nd Stage=$O_2$/He=0.3/1.1
3rd Stage=$O_2$/He=0.2/0.8

| | Percent |
|---|---|
| EB conv. | 82 |
| Sty. sel. | 89 |
| Sty. yield | 73 |
| Burning | 2.3 |

In another run, 33 grams of catalyst were placed in a single bed and ethylbenzene was dehydrogenated with $SO_2$ both with and without oxygen addition. Results are shown in Table VI.

TABLE VI

Catalyst =99.5% $Al_2O_3$—0.5% $Na_2O$ (S.A.=3 m.²g.)
EB Sp. Vel.=0.3 w./w./hr.
Temperature=1100° F.
Results at 5½ hours onstream (a) Feed mole ratio=EB/$SO_2$/He/$H_2O$=1/0.2/1/2

| | |
|---|---|
| EB conv., percent | 54 |
| Sty. Sel., percent | 94 |
| Sty. yield, percent | 51 |
| Percent burning | 0.7 |

11

TABLE VI—Continued (b) Feed mole ratio=EB/SO$_2$/O$_2$/He/H$_2$O= 1/0.2/0.5/2.8/2

| | |
|---|---|
| EB conv., percent | 59 |
| Sty. Sel., percent | 83 |
| Sty. yield, percent | 49 |
| Percent burning | 6.2 |

This run clearly shows that in a single stage reaction, i.e., no oxygen injection, although oxygen will increase the conversion, the selectivity and yield both decrease and the amount of burning sharply increases, thereby evidencing poor feed utilization. When comparing the foregoing results it is evident that for oxygen to be most effective, it must be added after the reaction has been initiated, i.e., injected into the reaction zone downstream of the feed inlet.

Example 2

Ethylbenzene was dehydrogenated with SO$_2$ and oxygen staging accordingly:

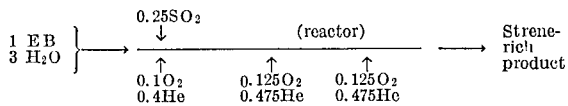

with a 99.5 wt. percent Al$_2$O$_3$-0.5 wt. percent Na$_2$O catalyst of 3 m.$^2$/gm. surface area and promoted with 0.01 mol Ba(NO$_3$)$_2$ per 150 gm. of catalyst, space velocity was 0.3 w./w./hr. and temperature was 1175° F. The ethylbenzene conversion was 90%, styrene selectivity 93%, styrene yield 81%.

In a similar reaction under identical conditions, the following reactant amounts were employed:

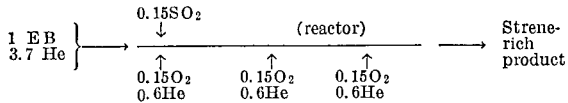

The ethylbenzene conversion was 86%, styrene selectivity 94%, styrene yield 81%.

Comparison of these two runs shows that the credits of oxygen addition can be taken in the decrease of SO$_2$ required to produce an equivalent styrene yield.

Example 3

This example shows the effect of temperature on an SO$_2$ staged O$_2$ dehydrogenation using a TiO$_2$ catalyst and a space velocity of 0.1 w./w./hr.

TABLE VII

| | 1st stage | 2d stage | | 3d stage | |
|---|---|---|---|---|---|
| EB/SO$_2$/He/H$_2$O | 1/0.2/1/2 | O$_2$ | 0.3 | O$_2$ | 0.2 |

| Temp., ° F. | Percent | | |
|---|---|---|---|
| | Conv. | Sel. | Yield |
| 1,025 | 83 | 93 | 78 |
| 1,050 | 83 | 92 | 77 |
| 1,100 | 86 | 88 | 76 |

Thus, as temperature increases, selectivity tends to decrease. However, in an identical run using a Ba promoted TiO$_2$, styrene yields were 5% higher for each temperature level.

Example 4

This example is similar to Example 3, except the catalyst was promoted with Ba.

TABLE VIII

| | 1st stage | 2d stage | | 3d stage | |
|---|---|---|---|---|---|
| EB/SO$_2$/He/H$_2$O | 1/0.2/1/2 | O$_2$/He | 0.3/1.1 | O$_2$/He | 0.2/0.8 |

| Temp., ° F. | Percent | | |
|---|---|---|---|
| | Conv. | Sel. | Yield |
| 950 | 75 | 96 | 72 |
| 1,000 | 85 | 95 | 80 |
| 1,025 | 88 | 93 | 82 |
| 1,050 | 92 | 94 | 86 |
| 1,100 | 93 | 93 | 86 |
| 1,175 | 91 | 88 | 80 |

12

Example 5

This example shows the diluent effect on ethylbenzene dehydrogenation with a Ba on TiO$_2$ catalyst, space velocity of 0.1 w./w./hr.

TABLE IX

| | 1st stage | 2d stage | | 3d stage | |
|---|---|---|---|---|---|
| EB/SO$_2$/He | 1/0.2/1 | O$_2$ | 0.3 | O$_2$ | 0.2 |

| Temp., ° F. | 1st stage H$_2$O dil. | Percent | | |
|---|---|---|---|---|
| | | Conv. | Sel. | Yield |
| 1,050 | 4 | 82 | 94 | 77 |
| 1,075 | 4 | 88 | 92 | 82 |
| 1,100 | 4 | 89 | 93 | 83 |
| 1,050 | 3 | 90 | 92 | 82 |
| 1,050 | 2 | 91 | 91 | 83 |
| 1,025 [1] | 2 | 92 | 93 | 85 |

[1] Maintains yields > 80% for 20 hours.

What is claimed is:

1. A process for the dehydrogenation of a dehydrogenatable organic compound which comprises reacting in the vapor phase as a temperature above about 700° F. in a reaction zone, a mixture consisting essentially of a dehydrogenatable organic compound, a sulfur-containing dehydrogenation promoter and oxygen, the dehydrogenating promoter being selected from the group consisting of (i) sulfur compounds that react with the dehydrogenatable organic compound to produce hydrogen sulfide or sulfur, and adding the oxygen to the reaction zone incrementally at more than one point, each incremental oxygen addition being insufficient to cause substantial burning of the dehydrogenatable organic compound.

2. The process of claim 1 wherein an inert diluent is employed in an amount of at least about one mole per mole of dehydrogenatable organic compound.

3. The process of claim 1 wherein the reaction is effected in the presence of a low surface area catalyst.

4. The process of claim 1 wherein the dehydrogenation promoter is a sulfur oxide.

5. A process for the dehydrogenation of a dehydrogenatable organic compound which comprises reacting, in the vapor phase at temperatures ranging from about 800° F. to 1500° F. in a dehydrogenation zone, a mixture consisting essentially of a C$_{2-20}$ hydrocarbon having at least one —CH—CH— grouping, a sulfur oxide, and oxygen, adding the oxygen to the reaction zone incrementally at more than one point, each incremental oxygen addition being insufficient to cause substantial burning of the hydrocarbon, effecting the reaction in the presence of an inert diluent in an amount of at least about one mole of diluent per mole of hydrocarbon, in the presence of a catalyst having a surface area ranging from about 0.1 to about 100 square meters per gram.

6. The process of claim 5 wherein the sulfur oxide is sulfur dioxide.

7. The process of claim 5 wherein the total amount of available oxidant (oxygen plus sulfur oxide) ranges from about 0.01 to about 1.5 moles per mole of hydrogen to be abstracted from the hydrocarbon.

8. The process of claim 7 wherein the amount of available sulfur oxide ranges from about 0.01 to about 0.6 moles per mole of hydrogen to be abstracted from the hydrocarbon.

9. The process of claim 7 wherein each incremental oxygen addition does not exceed a molar ratio of about 1.5 relative to hydrogen sulfide present in the reaction zone.

10. The process of claim 7 wherein each incremental oxygen addition does not exceed a molar ratio of about 1 relative to sulfur present in the reaction zone.

11. The process of claim 7 wherein oxygen is added to the reaction zone at the feed point and the amount of oxygen in the feed does not exceed about 0.2 mole per mole of hydrogen to be abstracted from the hydrocarbon.

12. The process of claim 7 wherein the reaction zone is cooled at the points of oxygen addition other than the feed point.

13. The process of claim 7 wherein the sulfur oxide is added to the reaction zone incrementally and at least at one point other than the feed point.

14. The process of claim 7 wherein the catalyst is a Group II–VIII metal oxide, salt or oxide mixture.

15. The process of claim 14 wherein the hydrocarbon is selected from the group consisting of $C_4$–$C_8$ monoolefins and paraffins, $C_8$–$C_{10}$ alkyl benzenes, and $C_8$–$C_{10}$ alkenyl cycloaliphatics.

16. The process of claim 15 wherein the sulfur oxide is sulfur dioxide.

17. The process of claim 16 wherein the catalyst also contains a minor amount of a member selected from the group consisting of metals, salts, oxides, and hydroxides of alkali metals and alkaline earth metals.

18. The process of claim 16 wherein the catalyst is alumina.

19. The process of claim 16 wherein the catalyst is titania.

20. The process of claim 16 wherein the catalyst is a titanate.

21. The process of claim 16 wherein the hydrocarbon is ethylbenzene.

22. The process of claim 6 wherein the sulfur dioxide is present in a molar amount ranging from about 0.001 to 0.6 moles per mole of hydrocarbon.

23. The process of claim 16 wherein the catalyst is magnesia.

References Cited

UNITED STATES PATENTS

| | | | |
|---|---|---|---|
| 2,418,374 | 4/1947 | Stone | 260—680 |
| 2,720,550 | 10/1955 | Danforth | 260—668 |
| 2,867,677 | 1/1959 | Murray | 260—683.3X |
| 3,299,155 | 1/1967 | Adams | 260—669 |
| 3,006,944 | 10/1961 | Fenske et al. | 260—669X |
| 3,361,839 | 1/1968 | Lester | 260—669 |
| 3,375,288 | 3/1968 | De Rosset | 260—669 |
| 3,403,192 | 9/1968 | Vadekar et al. | 260—669X |

CURTIS R. DAVIS, Primary Examiner

U.S. Cl. X.R.

260—666, 680, 683.3